UNITED STATES PATENT OFFICE.

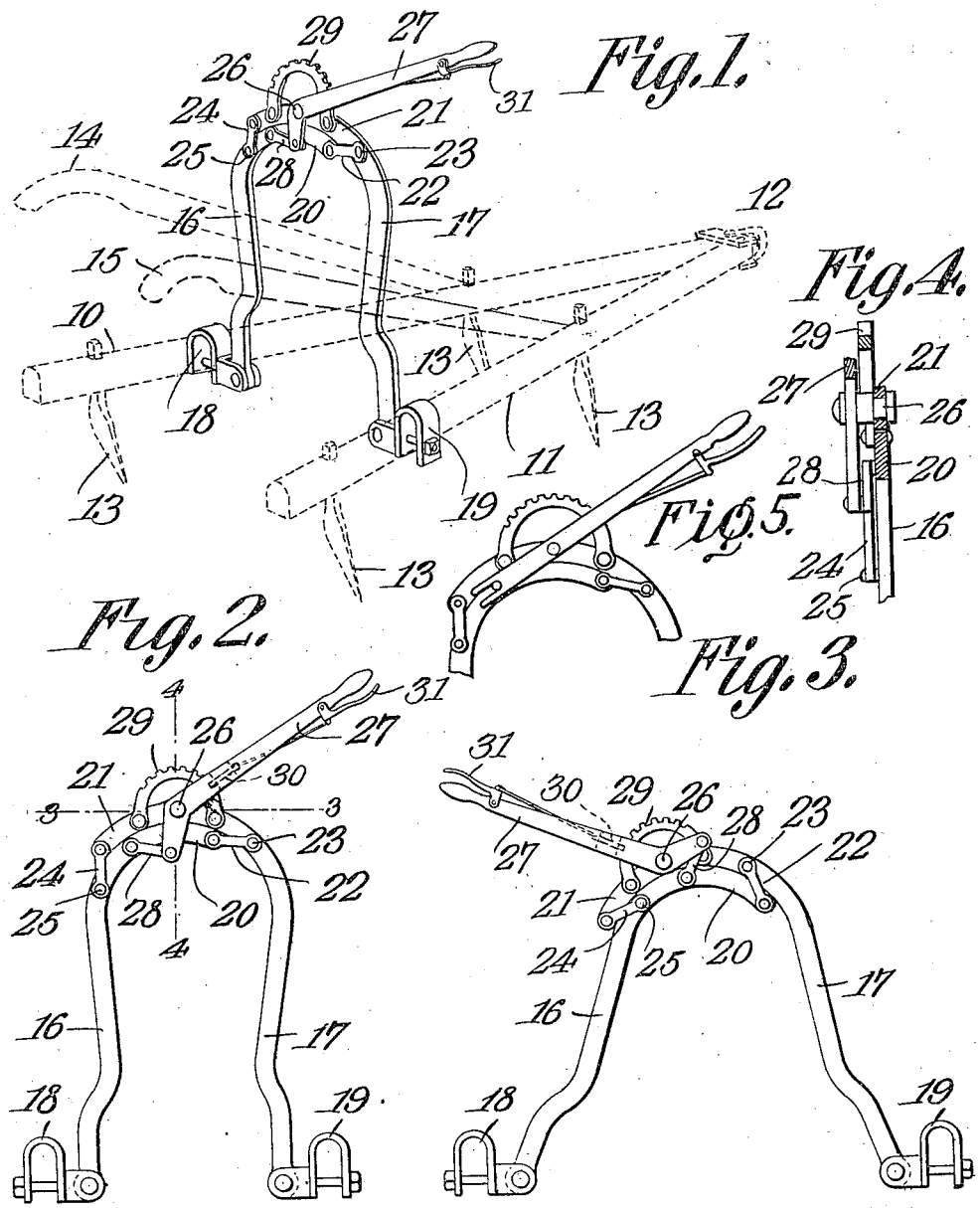

GENERAL LOWEL BATES, OF ELLIS COUNTY, TEXAS.

CULTIVATOR ATTACHMENT.

No. 839,536.     Specification of Letters Patent.     Patented Dec. 25, 1906.

Application filed September 4, 1906. Serial No. 333,203.

*To all whom it may concern:*

Be it known that I, GENERAL LOWEL BATES, a citizen of the United States, residing in the county of Ellis and State of Texas, have invented a new and useful Cultivator Attachment, of which the following is a specification.

This invention relates to cultivators and like implements, and has for its object to provide a simply-constructed device which may be applied to any of the various constructions of implements of this class having swinging tooth-bars and by means of which the cultivator shovels or teeth may be readily adapted to the widths of the rows of plants.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a perspective view of the improved device applied. Fig. 2 is a rear elevation with the parts in closed or withdrawn position. Fig. 3 is a similar view with the parts in open or distended position. Fig. 4 is a detail, enlarged, in section on the line 4 4 of Fig. 2. Fig. 5 is a detail view of a modified construction.

The improved device is adapted to be attached to any of the various forms of cultivators and like implements which embody in their construction oppositely-swinging tooth-bars, and for the purpose of illustration a conventional structure of this class is indicated by dotted line in Fig. 1, the tooth-bars being indicated at 10 11, coupled to a clevis at 12 and with spaced depending teeth 13 and handles 14 15.

The improved device comprises two standards 16 17, having clips 18 19 of suitable form at one end for coupling to the tooth-bars 10 11 and with lateral extensions 20 21 at the other ends, the extensions interlapping and preferably curved, as shown.

Swinging from the free end of the lateral portion 20 is a link 22, and coupled at 23 to the body portion of the standard 17 and swinging from the free end of the lateral portion 21 is a link 24 and coupled at 25 to the body of the standard 16.

Pivoted at 26 to the lateral portion 21 is a lever 27, the lower or shorter end of the lever being coupled to the lateral portion 20 by a link 28.

Attached to the lateral portion 21 is a notched segment 29, and connected to the lever 27 is a pawl of the usual construction and indicated at 30 and operative by a trip-lever 31 in the usual manner. By this arrangement it is obvious that when the lever 27 is disposed in one position, or as shown in Figs. 1 and 2, the standards 16 17 and their attachments will be moved into closed position and holding the cultivator-bars at their nearest relative position. Then if the lever be moved into its open position, as in Fig. 3, the standards and their attachments will be distended and dispose the cultivator-bars at their farthest relative position.

It will also be obvious that the standards and cultivator may be adjusted and held at any intermediate point within the range of the segment 29. Thus the cultivator-bars may be adjusted to adapt them to any required width of row or to space the hoes or teeth to operate at any required distance apart. It will be noted that during the adjustment of the two standards it is necessary for the links 22 and 24 to swing past their dead-centers, and therefore it becomes impossible to move the standards out of adjusted position, even though the locking means 29 and 30 should not be employed, unless the upper end of the standard 16 is moved downward away from the corresponding portion of the standard 17 for a short distance. The attachment therefore becomes self-locking, and the locking devices 29 and 30 are merely used so as to prevent accidental independent movement of the parts—as, for instance, when the device is being jolted.

The device is simple in construction, strong and durable, and readily adapted to any size or construction of implement having swinging tooth-bars.

It will of course be understood that, if desired, the link 28 may be dispensed with, and the lower end of the lever 27 may be forked and placed directly in engagement with the standard 16, or any other preferred means may be employed for operatively connecting the lever and the standard 16.

Having thus described the invention, what is claimed is—

An attachment for cultivators consisting of oppositely-disposed standards having overlapping laterally-curved end portions, links pivotally connecting the overlapping portions of the standards, and means mounted upon one of the standards for moving the other standard to swing the links past their dead-centers, the movement of said standard being limited in each direction by the other standard, and means for locking the standards in their adjusted positions.

In testimony that I claim the foregoing as my own I have hereto affixed my signature in the presence of two witnesses.

GENERAL LOWEL $\overset{\text{his}}{\times}$ BATES.
mark

Witnesses:
B. H. BRINDLEY,
J. L. SHIPPEY.